Patented June 27, 1944

2,352,173

UNITED STATES PATENT OFFICE 2,352,173

LACQUER

Laszló Auer, East Orange, N. J., assignor to Ridbo Laboratories, Inc., Paterson, N. J., a corporation of New Jersey No Drawing. Application December 22, 1941, Serial No. 424,008

14 Claims. (Cl. 106—173)

This invention relates to lacquers, i. e., coating compositions in which the film-forming solids form the lacquer film primarily in consequence of evaporation of volatiles present, rather than by chemical changes in the film-forming ingredients.

The principal film-forming ingredient or film-forming material of such a lacquer is customarily termed the lacquer base. The bases are of various types, as follows:

A. Cellulose derivatives, such as—
  1. Cellulose esters, e. g.
    (a) Nitrocellulose
    (b) Acetylcellulose
  2. Mixed cellulose esters, e. g.
    (a) Cellulose aceto butyrate—Hercose C
    (b) Cellulose aceto propionate—Hercose AP
  3. Cellulose ethers, e. g.
    (a) Ethyl cellulose
    (b) Benzyl cellulose
B. Rubber chlorine compositions, such as—
  1. Chlorinated rubber
  2. Rubber monochloride ("Pliolite" and "Pliofilm")
C. Vinyl compounds, such as—
  1. Vinyl chloride
  2. Vinyl acetate.
  3. Co-polymer of vinyl chloride and acetate
D. Methacrylates In addition to the lacquer base, lacquers customarily include one or more plasticizers, and frequently also a resin. In some cases, the resin is of a type (for instance, alkyd resins) imparting both resinous and plasticizing characteristics to the lacquer, in which case other plasticizers may be omitted.

The foregoing ingredients (the lacquer base, plasticizer and resin) normally constitute the vehicle-solids, which solids, of course, are carried by a volatile solvent mixture imparting the desired shipping and application (brushing or spraying, etc.) consistency and characteristics.

The present invention is concerned with lacquers of the foregoing general class whether or not such lacquers additionally contain pigments. Briefly stated, the invention contemplates employment of a rosin-terpene hydrocarbon mixture in such lacquers, primarily in the position of a plasticizer, although said rosin-terpene hydrocarbon mixture, especially when incorporated in the higher percentages herein contemplated, additionally serves to supplement the film-forming characteristics of the lacquer base, as will further appear.

What I mean by the term "rosin-terpene hydrocarbon mixture" will be set out more fully hereinafter, but it is first pointed out that the employment of the rosin-terpene hydrocarbon mixture has a number of important advantages mentioned just below. For brevity and convenience, the expression "R.-T mixture" is employed herein to designate that ingredient.

While the invention is applicable to many types of lacquers, the invention is herein illustrated as applied to nitrocellulose lacquers.

When employing the R.-T mixture in accordance with this invention, the quantity of other plasticizers normally employed may be greatly reduced. For example, in nitrocellulose base lacquers for metal or wood furniture, from about 20% to 70% of plasticizers (based on nitrocellulose content) is commonly used; whereas, when employing the R.-T mixture in such lacquers, the content of usual plasticizers may be greatly reduced, for instance to about 10% to 20%. Similarly, when employing the R.-T mixture in nitrocellulose lacquers for leather, rubber or textile goods, or in artificial leather dopes, the plasticizer content may be cut down considerably.

The foregoing represents a very considerable economic gain because of the fact that the R-T mixture is very much less expensive than the customary plasticizers.

Since the R.-T mixture not only has plasticizing properties but, in addition, has appreciable film-forming qualities, and further since I have found that the R.-T mixture is compatible with lacquer bases in very high percentages, the R.-T mixture may be relied upon to a considerable extent for film formation. By way of example, in nitrocellulose lacquers, the content of the R.-T mixture may even be as high as 200% to 400% of the nitrocellulose content, or even up to about 500% for special purposes.

This effects a further economic gain because of the relative cost of the lacquer base and of the R-T mixture.

A still further advantage lies in the fact that when employing the R.-T mixture I have found that the nitrocellulose or other lacquer base materials may be of much higher viscosity than has been practicable to employ heretofore in most known types of lacquers. The reasons for this are explained hereinafter, but it is first pointed out that nitrocellulose is commercially available in wetted form (containing approximately 70% solids and the balance an alcohol such as ethyl alcohol), the nitrocellulose varying in viscosity from about 18–25 C. P. S. type or ¼ sec. type to about 1300 sec. type (Hercules method of grading).

In considering the following, it should be kept in mind that in nitrocellulose lacquers, the film characteristics are regulated by the relationship of plasticizers and resins to nitrocellulose content. Thus, for a nitrocellulose lacquer of given film characteristics, the relationship of plasticizer and resin to nitrocellulose should be substantially the same regardless of the viscosity of the nitrocellulose employed.

Although there are certain advantages in employing low viscosity nitrocellulose (for instance ½ sec or ¼ sec. nitrocellulose) the cost of the finished lacquer, when using low viscosity nitrocellulose is relatively high. One reason for this is that the low viscosity nitrocellulose requires relatively little dilution with solvents to provide suitable shipping consistency, so that the concentration of nitrocellulose (an expensive ingredient) remains relatively high. Moreover, because of the low dilution, when employing low viscosity nitrocellulose, the content of plasticizer and resin is also high per gallon of finished lacquer.

On the other hand, where nitrocellulose of relatively high viscosity is used, greater dilution with solvents is required in order to cut the lacquer to appropriate shipping consistency. This increase in cutting results in decrease in the film-forming solids of the lacquer, so that the films are thin and unsatisfactory, or require application of several coats to achieve coverage equivalent to that obtainable where low viscosity nitrocellulose is used.

Attempts to overcome this problem (when using high viscosity nitrocellulose) by increasing plasticizer or resin, or both, have not been practical, since increase of plasticizer produces a spongy or cheesy film, whereas increase in the quantity of resin produces brittleness. When both are increased in relation to the nitrocellulose content, the resultant films are also unsatisfactory and commonly manifest the undesired cheesy and brittle characteristics.

In contrast to the foregoing, when employing the R-T mixture herein contemplated, it has been found that the normal balance of ingredients need not be adhered to, so that the content of the R-T mixture may be greatly increased with relation to other ingredients. In consequence of this, the finished lacquer contains a lower quantity of nitrocellulose, and a high proportion of the R-T mixture, whether or not other plasticizers and resins are used. Moreover, the films are not cheesy or brittle, notwithstanding departure from the usual balance of ingredients. The R-T mixture contributes solids for film formation and, in addition, does not require excessive dilution with solvents to secure the desired shipping consistency.

With reference to the characteristics of the lacquer produced in accordance with this invention, it may be mentioned that a typical nitrocellulose lacquer, when properly formulated, has good elasticity, gloss and drying characteristics.

It is of especial advantage that the R-T mixture imparts high adhesion properties to lacquers, e. g. for use in rubber finishing.

The R-T mixture has a still further advantage when the lacquer also contains a pigment. In this event, the R-T mixture is desirably ground with the pigment prior to combining the pigment with the lacquer base. The R-T mixture having good wetting power (appreciably better than castor oil—which is frequently used in lacquers), facilitates grinding and serves to improve pigment dispersion in the lacquer being made.

The physical characteristics of the lacquer may, of course, be varied by control of the content of several ingredients, as will be brought out more fully hereinafter.

With the foregoing general considerations in mind, it is now pointed out that in accordance with the preferred practice of the invention, the R-T mixture is prepared preliminarily and thereafter introduced as such into the lacquer mix.

Several methods for initially providing the R-T mixture are briefly described hereinafter, but it is first noted that both the rosin and terpene components are preferably derived from natural rosins, such as gum and wood rosins.

Four examples for producing the R-T mixture are as follows:

R-T Example A 300 parts of rosin and 15 parts by weight of p-toluene sulpho chloride are heated under a vacuum of about 25 to 27" of mercury, without stirring, to a temperature of about 290° to 300° C., this temperature being maintained for about 4 hours.

The product obtained from this example is of consistency approximating that of heavy oil and has an acid value of about 40 to 60.

R-T Example B 300 parts of rosin are heated with 20 to 30 parts by weight of zinc carbonate under a vacuum of about 25 to 30" of mercury, for about 10 to 12 hours, at about 270° to 280° C.

The product obtained from this example is of consistency approximating that of a plastic resin with cold flow and has an acid value of about 60 to 80.

R-T Example C 1000 parts of N-wood rosin are heated with 6 parts of p-toluene sulphonic acid and 24 parts of p-toluene sulpho chloride, under vacuum of 100 mm. Hg pressure, for 3 hours, at a temperature of 270° C.

The resulting product is an oily material of viscosity from Z to Z1 in the Gardner scale, and of color 17 also in the Gardner scale. The acid number is 4.1 and the loss in weight is about 16.5%.

R-T Example D 1000 parts of N-wood rosin are heated with 10 parts of p-toluene sulphonic acid under vacuum of 100 mm. Hg pressure, for 5 hours, at a temperature of 270° C.

The resulting product has a viscosity of about Z5 and a color of 18, both in the Gardner scale. The acid number is 3.4 and the weight loss is 15%.

Treatments of the types mentioned just above in Examples A to D result in limited decarboxylation of the rosin, leaving a mixture of rosin and terpene hydrocarbons in varying proportions, depending upon the nature and extent of treatment. This may be measured by the acid value of the material. Thus, with a typical rosin having an initial acid value of 160, the treatment is preferably carried out to reduce the acid value to a point lying between about 5 and 120. This range gives a mixture varying from about 75% to 3% rosin and from about 25% to 97% terpene hydrocarbons.

For many purposes I have found that a desirable acid value range is from 20 to 80. The lower limit of this range (20) corresponds to a 1 to 7 ratio between rosin and terpene hydrocarbons. On the other hand, the upper limit (80) corresponds to a 1 to 1 ratio between rosin and terpene hydrocarbons.

The treatment described above not only effects partial decarboxylation but, in addition, other changes are brought about, apparently because of colloidal transformations in the rosin (which I believe to be an isocolloid), in consequence of which the rosin is softened or liquefied.

The treatment to produce the R-T mixture may be varied in a number of respects, as disclosed, for example, in my copending applications Serial No. 386,371, filed April 1, 1941 (Patent 2,311,200, February 16, 1943), and Serial No. 318,650, filed February 12, 1940 (Patent 2,298,270, October 13, 1942), of which the present application is a continuation-in-part, and also disclosed in my prior applications Serial Nos. 446,171, filed April 21, 1930 (Patent 1,980,367, November 13, 1934); 359,425, filed April 30, 1929 (Patent 2,213,-944, September 10, 1940); and 143,786, filed October 23, 1926 (Patent 2,189,772, February 13 1940); all of which prior applications disclose certain subject matter in common with the present application.

Although the R-T mixture produced in accordance with any one of Examples A to D above is suitable for substitution in lacquer in the position of a plasticizer, it may be mentioned that the plasticizing effect of the product produced in accordance with Examples A, C and D is appreciably greater than that of the product produced in accordance with Example B.

Moreover, the product of Example B ordinarily could not be employed in quantities as great as the products of Examples A, C and D, since the former is harder and may, in high percentages, impart brittleness to the lacquer. By way of example, if the product of Example B is used in a nitrocellulose lacquer, the quantity ordinarily should not be above about 200% of the nitrocellulose content (unless special adjustment of the other ingredients is resorted to). However, the products of Examples A, C and D may be used in a nitrocellulose lacquer up to about 300% of the nitrocellulose content. In case of specialty lacquers, even more than 300% may be suitable.

It should also be noted that other modifying agents may be employed such, for example, as zinc chloride and agents disclosed in various of my earlier applications—for instance magnesium sulphate and ammonium iodide as mentioned in Patent No. 2,311,200. The quantity of modifying agent employed should be from an appreciable trace (fractional percentage) up to about 30% of the rosin, preferably from a trace to about 10%.

The foregoing discussion of my preferred method for producing the "rosin-terpene hydrocarbon mixture" clarifies what I mean by that expression. In further explanation of this use of the terms "rosin" and "terpene hydrocarbons," it may be stated that by "rosin" I mean commercial gum rosin and/or wood rosin products, containing mixtures of rosin acids, known today as abietic acid, pyroabietic acid and d-pimaric acid, amongst others. By "terpene hydrocarbons" I mean terpene radicals of rosin acids, such as abietene, or high molecular residues of such terpene radicals of rosin acids. By the term "residue," used just above, I mean either the terpene molecule secured by a secondary splitting off of radicals (secondary to the primary decarboxylation), for instance, methyl groups, etc.; or the terpene molecule after changes in unsaturation (hydrogen content) of the original molecule; such products being obtained from rosin acids in the course of the treatment used to prepare the rosin-terpene hydrocarbon mixture.

It may be mentioned that typical rosins contain about 90% abietic acid.

Although my preferred method for producing the mixture also brings about other changes in the rosin under treatment, the "R-T mixture" consists essentially or in major part of abietic acid and abietene in the ratios hereinbefore referred to.

A similar mixture of the same essential or basic composition may be secured in other ways. Thus, the heavier fractions of rosin distillation (rosin oil—consisting essentially of terpene hydrocarbons as above defined) may be remixed with rosin in about the proportions hereinbefore indicated.

As is known, rosin oil may be produced in a variety of ways, for instance, by distillation in a still at progressively increased temperatures, rosin spirits coming over at about 160° C., and then the heavier products of rosin oils, at temperatures ranging from about 200° C. to about 270° C. The heavier fractions are best suited to the present purposes.

In accordance with another method for producing rosin oil, rosin is heated at from 150° C. to 325° C. (preferably at about 300° C.), with 2% of a siliceous earth or of activated carbon.

Rosin oil produced in accordance with the foregoing or other known methods may be remixed with rosin in the desired proportions, in order to produce the R-T mixture herein contemplated.

Although I prefer to preliminarily prepare the R-T mixture and then add said mixture as such to the lacquer mix, it is to be understood that the two components of the mixture may be added to the lacquer mix individually under some circumstances.

Moreover, as hereinbefore indicated, in preliminarily preparing the R-T mixture, I prefer to employ rosin modifying processes of the type indicated under Examples A to D inclusive above. Preparation of the R-T mixture by heating rosin in the presence of modifying agents results in less decomposition of the terpene molecule than occurs where rosin oil is produced by distillation. In consequence, distillation produces a low molecular product, which has a higher evaporation rate than the high molecular product obtained by heating rosin in the presence of modifying agents as described above. While the general range of evaporation rates of both types of products is relatively low, still there is a considerable difference between the rates of evaporation of the products produced by my preferred method and the products produced with distilled rosin oil. The lower evaporation rate of the R-T mixture produced with modifying agents is sufficient to manifest definite advantage in aging qualities of the resultant lacquer films.

Another advantage in preliminarily preparing the R-T mixture by heating rosin in the presence of modifying agents is that the product may be produced with greater uniformity from batch to batch, than is possible where rosin distillation products are recombined with rosin to produce the mixture. Although the heavier fractions of distillation are best suited to the purposes of this invention, it is impractical, or at least very difficult, to completely isolate the heavier fractions from the lighter fractions.

It may also be mentioned that the color of the R-T mixtures produced with modifying agents may be made very light, in comparison with the color of rosin oils, which is usually very dark. The lighter color is very important in lacquers.

LACQUER EXAMPLES

In preparing these examples, it is mentioned that commercial 5–6 sec. nitrocellulose was used (containing about 70% solids, balance ethyl alcohol). A master nitrocellulose solution was prepared in the following proportions:

| | Pounds |
|---|---|
| Commercial 5-6 sec. nitrocellulose (70% solids) | 100 |
| Toluol | 140 |
| Butyl acetate | 140 |

In each of the following examples, the reference to "cellulose solution" indicates the master solution referred to just above. All parts are by weight.

*Example 1*

| | Pounds |
|---|---|
| Cellulose solution | 38 |
| Butyl alcohol | 6 |
| Ethyl alcohol | 24 |
| Lactol spirits (light fraction of petroleum solvents commonly used in lacquers) | 42 |
| Di-butyl phthalate (plasticizer) | 1½ |
| Butyl acetate | 5 |
| R-T mixture | 22½ |

*Example 2*

| | |
|---|---|
| Cellulose solution | 38 |
| Butyl cellosolve | 2 |
| Ethyl alcohol | 10 |
| Butyl alcohol | 4 |
| Union solvent No. 8 (petroleum type lacquer solvent with high aromatic content) | 24 |
| Di-butyl phthalate | 1½ |
| R-T mixture | 32½ |

*Example 3*

| | |
|---|---|
| Cellulose solution | 38 |
| Butyl acetate | 6 |
| Butyl alcohol | 6 |
| Ethyl acetate | 3 |
| Lactol spirits (see Example 1) | 28 |
| Di-butyl phthalate | 1½ |
| R-T mixture | 22½ |

*Example 4*

| | |
|---|---|
| Cellulose solution | 38 |
| Amyl propionate | 5 |
| Butyl alcohol | 6 |
| Ethyl alcohol | 24 |
| Lactol spirits (see Example 1) | 42 |
| Di-butyl phthalate | 1½ |
| R-T mixture | 22½ |

*Example 5*

| | |
|---|---|
| Cellulose solution | 38 |
| Amyl propionate | 5 |
| Butyl alcohol | 6 |
| Ethyl alcohol | 24 |
| Lactol spirits (see Example 1) | 42 |
| Di-butyl phthalate | 1½ |
| R-T mixture | 15 |

*Example 6*

| | |
|---|---|
| Cellulose solution | 38 |
| Amyl propionate | 2 |
| Ethyl alcohol | 10 |
| Butyl alcohol | 4 |
| Lactol spirits (see Example 1) | 24 |
| Di-butyl phthalate | 6 |
| R-T mixture | 22½ |

The above lacquers may be used for various purposes including wood finishing.

Certain general considerations should be kept in mind in connection with the lacquer composition according to this invention.

First, it should be understood that the quantity and the particular characteristics of the R-T mixture employed (such as acid value, viscosity, drying characteristics, melting point, etc.) should be selected in accordance with the particular use for which the lacquer is intended. Desirably, the R-T mixture is used in amounts upwards of 50% of the lacquer base.

For example, while use of the R-T mixture is highly effective in lacquers for rubber goods (because of the high adhesion properties attained), it may be mentioned that the quantity of the R-T mixture present in lacquers for rubber goods should preferably not exceed about 100% of the nitrocellulose content. A nitrocellulose lacquer containing up to about 100% of the R-T mixture—say from 50% to 100%—is highly effective in finishing rubber footwear, rubber-proofed textiles, rubber belting and rubber balls. It should be understood that for special purposes, more or less than this range may be useful.

With respect to lacquers for rubber goods, it is mentioned that by proper formulation, the lacquer of the present invention may be adapted for application either before or after vulcanization of such rubber goods.

Maintenance of high gloss is frequently important in lacquers and on this subject it is first pointed out that loss of gloss may sometimes occur in small, microscopic and evenly distributed spots impairing the continuity of the film surface, with the result that the entire surface becomes dull, and may sometimes occur in splotches, in which event the effect is referred to as "gum blush."

I have found, however, that in nitrocellulose lacquers, neither type of impairment of gloss will ordinarily occur where the content of R-T mixture does not exceed about 100% of the nitrocellulose content. Where, for any reason, it is desirable to employ the R-T mixture in quantities greater than equality with the nitrocellulose, maintenance of high gloss may be ensured by adopting one or more of the following expedients:

(a) The solvent balance of the solvent mixture may be such as to contain from about 1% to about 10% of solvents having two characteristics—
1. Capability of dissolving both the nitrocellulose and the R-T mixture, and
2. A relatively slow evaporation rate (high boiling point), so that this particular solvent will be among the last to evaporate upon drying of the lacquer.

Examples of such solvents are:

Cellosolve
Amyl propionate
Dioxane
Octyl alcohol
Octyl acetate (b) Other glossy resins may be incorporated.
(c) The aromatic content of the diluent portion of the solvent mixture may be increased.

It may be mentioned that good mutual solvents of medium evaporation range include—

Butyl alcohol
Ethyl acetate
Butyl acetate
Amyl acetate
Butyl propionate
Amyl propionate I have found that, when higher gloss is required, the aromatic types of diluents are more suitable for lacquers incorporating the R-T mixture than are the petroleum type.

If, for various purposes, such as increasing weather resistance, it is desired to reduce the acid value of any particular R-T mixture employed, that mixture may be esterified, at least to a limited extent. Thus, if the R-T mixture of Example B is used (having an acid value of about 60 to 80), it may for some purposes be desirable to esterify.

Since the R-T mixture has drying properties, small (usually fractional) percentages of driers, for instance cobalt, manganese and lead driers, should be added. The addition of driers may in general be made in accordance with known practice, the quantity of drier being proportional to the quantity of R-T mixture employed, and the calculation for drier content made on the assumption that the entire content of the R-T mixture is a drying oil. For example, .3% lead, .03% cobalt and .02% manganese (each percentage indicating metal content, based on the weight of the R-T mixture) is a satisfactory drier combination.

Although the R-T mixture may advantageously be used in some nitrocellulose lacquers (for instance, for rubber finishing) in amounts lower than 100% of the nitrocellulose content, the economic advantage is particularly favorable when using the R-T mixture in quantities ranging upward from equality with the cellulose content. In these latter ranges, substantial economic gain results from the displacement of plasticizer permitted thereby and from the fact that appreciable film formation is secured from the R-T mixture. At least certain R-T mixtures still further imparts resinous characteristics to the lacquer, so that for certain purposes where other resins have heretofore been used, such other resins may be dispensed with.

When using the R-T mixture in amounts from about 100% to 300% of the nitrocellulose content in a lacquer, the quantity of plasticizer may be reduced to a point lying between about 5% and about 30%, preferably between about 10% and about 20% of the nitrocellulose content. For plasticizers, those commonly used in the lacquer industry may be adopted, di-butyl phthalate, referred to in the foregoing examples, being typical. Other known plasticizers may also be used, such as triacetin, amyl tartarate, di-ethyl phthalate, di-butyl tartarate, aromatic esters, tricresyl phosphate, etc., and also castor oil, in connection with which latter it may be mentioned that the castor oil may desirably be modified by means of modifying agents which are soluble in the solvent mixture of the lacquer, as is disclosed in my copending application Serial No. 305,409, filed November 20, 1939 (Patent 2,293,038, August 18, 1942), and also in Patent No. 2,180,342, issued November 21, 1939.

I claim:

1. A lacquer of the nitrocellulose type, in which the film-forming vehicle-solids consist essentially of nitrocellulose, a plasticizer, and substantially non-volatile rosin ingredients comprising treated rosin material prepared by heating rosin in the presence of a decarboxylation promoting agent at a decarboxylating temperature, the rosin ingredients further being characterized by the presence of both rosin acids and rosin hydrocarbons and having an acid value between about 5 and 120, the content of the plasticizer being less than the content of said rosin ingredients.

2. A composition in accordance with claim 1 in which the rosin material is prepared by decarboxylating rosin at a temperature between about 270° C. to 300° C.

3. A composition in accordance with claim 1 in which the combined quantity of rosin acids and rosin hydrocarbons is not more than 200% of the nitrocellulose content and in which the quantity of plasticizer is from about 10% to about 20% of the nitrocellulose content.

4. A composition in accordance with claim 1 in which the nitrocellulose is of viscosity higher than 5 sec.

5. A lacquer of the nitrocellulose type, in which the film-forming vehicle-solids consist essentially of nitrocellulose, a plasticizer, and substantially non-volatile rosin ingredients comprising treated rosin material prepared by heating rosin in the presence of a decarboxylation promoting agent at a decarboxylating temperature, the rosin ingredients further being characterized by the presence of both rosin acids and rosin hydrocarbons and having an acid value between about 5 and 120, the combined content of rosin acids and rosin hydrocarbons being at least as great as that of the nitrocellulose.

6. A composition in accordance with claim 5 in which the combined content of rosin acids and rosin hydrocarbons is from 100% to 500% of the nitrocellulose content.

7. A composition in accordance with claim 5 and further incorporating a solvent mixture containing from about 1% to about 10% of a solvent selected from the class consisting of Cellosolve, amyl propionate, Dioxane, octyl alcohol and octyl acetate.

8. A composition in accordance with claim 5 and further incorporating a solvent mixture containing from about 1% to about 10% of high boiling point solvents which are solvents for both the nitrocellulose and for the rosin acids and rosin hydrocarbons.

9. A lacquer in which the film-forming vehicle-solids consist essentially of substantially non-volatile rosin ingredients and of a lacquer base ingredient of the type which dries primarily by virtue of evaporation of solvents, said rosin ingredients comprising treated rosin material prepared by heating rosin in the presence of a decarboxylation promoting agent at a decarboxylating temperature, the rosin ingredients further being characterized by the presence of both rosin acids and rosin hydrocarbons, and the combined content of rosin acids and rosin hydrocarbons comprising at least 50% of the lacquer solids.

10. A composition in accordance with claim 9 and further incorporating a drier, the content of which is proportional to the combined content of rosin acids and rosin hydrocarbons.

11. A composition in accordance with claim 9 in which the lacquer base ingredient comprises a rubber chlorine composition.

12. A composition in accordance with claim 9 in which the lacquer base ingredient comprises chlorinated rubber.

13. A composition in accordance with claim 9 in which the lacquer base ingredient comprises ethyl cellulose.

14. A composition in accordance with claim 9 and further incorporating a resin for imparting gloss.

LASZLÓ AUER.